United States Patent [19]

Geist et al.

[11] Patent Number: 4,624,974

[45] Date of Patent: Nov. 25, 1986

[54] WATER-DISPERSIBLE BINDERS FOR CATIONIC ELECTRO-DIP PAINTS, AND METHOD FOR THEIR PRODUCTION

[75] Inventors: Michael Geist, Munster; Gunther Ott, Munster-Wolbeck; Georg Schon, Everswinkel, all of Fed. Rep. of Germany

[73] Assignee: BASF Farben und Fasern Aktiengesellschaft, Hamburg, Fed. Rep. of Germany

[21] Appl. No.: 646,245

[22] Filed: Aug. 31, 1984

[30] Foreign Application Priority Data

Sep. 3, 1983 [DE] Fed. Rep. of Germany ....... 3331904

[51] Int. Cl.[4] .......................... C08L 63/00; C09D 3/58; C09D 5/46
[52] U.S. Cl. .................................... 523/414; 523/402; 523/415; 204/181.7; 524/901; 524/902
[58] Field of Search ................ 524/901, 902; 523/402, 523/414, 415; 204/181.7

[56] References Cited

U.S. PATENT DOCUMENTS 3,839,252 10/1974 Bosso et al. ......................... 523/414
3,947,339 3/1976 Jerabek et al. .................... 204/181.7
4,433,078 2/1984 Kersten et al. ................... 204/181.7
4,436,878 3/1984 Batzill et al. ..................... 204/181.7

FOREIGN PATENT DOCUMENTS 3108073 11/1982 Fed. Rep. of Germany ... 204/181.7
3210306 9/1983 Fed. Rep. of Germany ... 204/181.7

Primary Examiner—Ronald W. Griffin
Attorney, Agent, or Firm—Kenyon & Kenyon

[57] ABSTRACT

The invention relates to water-dispersible binders for cationic electro-dip paints which are reaction products of (A) low molecular weight epoxy resins containing aromatic groups and having an epoxide equivalent weight under 375, (B) aliphatic and/or alicyclic poly-functional alcohols and/or carboxylic acids having a molecular weight under 350, (C) elasticized polyphenols having a molecular weight over 350 and (D) primary and/or secondary amines and/or their salts, the reaction product of A and B having a content of aromatic groups, calculated as phenylene group, of 10–45%.

23 Claims, No Drawings

WATER-DISPERSIBLE BINDERS FOR CATIONIC ELECTRO-DIP PAINTS, AND METHOD FOR THEIR PRODUCTION

The invention relates to water-dispersible binders for cationic electro-dip paints, obtained by reaction of (A) low-molecular weight epoxy resins, containing aromatic groups and having an epoxy equivalent weight under 375, with (B) aliphatic and/or alicyclic poly-functional alcohols and/or carboxylic acids having a mean molecular weight under 350 to an epoxide group-containing intermediate product which contains a proportion of aromatic groups, calculated as phenylene group, of 10 to 45 percent by weight, and further modification of the resulting intermediate product with (C) a compound with at least two hydroxyl groups with addition to the epoxy groups and further reaction of (A), (B) and (C) with (D) primary and/or secondary amines or ammonium salts to achieve the required dispersibility in water, characterized in that component (C) is an elasticized polyphenol having a molecular weight over 350.

Cationic water-dispersible synthetic resins as binders for electro-dip paints are known. Thus, for example, DE-OS No. 2,701,002 describes such as resin which is a reaction product of a poly-epoxy having a molecular weight of at least 350, a secondary amine, and an organic polyol with at least two alcoholic primary hydroxyl groups. The resins are formed by chain extension of high-molecular weight poly-epoxies with at least two epoxy groups per molecule. The chain extension is obtained by an organic polyol, and the dispersibility in water is achieved by the addition of a secondary amine.

This and other known synthetic resins for cathodic electro-dip lacquering are often employed for priming, that is, the objects coated with them are given an additional finishing coat. With the resins known until now, however, it is a disadvantage that only coats of relatively thin layer thickness can be obtained. Thus, DE-OS No. 2,701,002 states attainable layer thicknesses of only 11.4 to 18/um. If a lacquer coating must meet especially high requirements with respect to corrosion resistance and surface quality, as is the case for instance with the lacquering of motor vehicles and other high-grade items, it has therefore been customary until now to apply a so-called filler as an additional layer between the electro-dip primer and the top coat. This is complicated and costly. It is desirable, therefore, to improve the electro-dip lacquering process in such a way that with this process greater layer thicknesses can be obtained. In the attempt to increase the layer thickness problems result from the fact that if the deposition voltage is increased beyond the breakdown voltage, surface defects in the film due to rupture of the layer will occur. Lengthening the coating time will also result in an increased layer thickness, but this increase cannot be continued at will because normally, due to the electric resistance of the deposited film, the layer thickness has an upper limit at which practically no further increase in layer thickness is achieved no matter how long the coating is continued.

From DE-OS No. 31 08 073 a water-dispersible binder for cationic electro-dip paints is known, the use of which leads to greater layer thicknesses of the deposited film. While this known binder gives coatings with excellent properties, it remains a problem to further improve the elasticity of the resulting coatings by modification of the binder.

It has now been found, surprisingly, that coatings of clearly improved properties are obtained if the binder used is not chain-lengthened with an aliphatic diol, but if polyphenols are employed for this purpose. Already in DE-OS No. 2,701,002 reference is made to the possibility of a competitive reaction of the secondary hydroxyl groups of an epoxy resin with the remaining oxirane groups in a chain extension with aliphatic polyols. In particular this side reaction can become predominant toward the end of the chain buildup. It is the merit of the present invention to have indicated a possibility for unambiguous conduction of the molecule structure by an increased reactivity and selectivity in the chain extension.

The object of the invention is, therefore, to provide a binder for cationic electro-dip paints, by the use of which coatings with increased layer thickness and simultaneously high elasticity and good flow are obtained.

For a binder of the initially mentioned kind this problem is solved according to the invention in that as component C, 5 to 40 percent by weight, referred to the sum of the components A, B, C and D, of an elasticized polyphenol have been employed and it corresponds to the following general formula

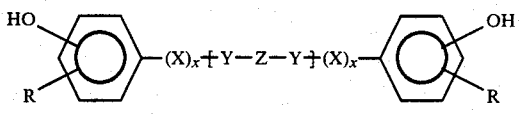

In the formula
X = alkylene, arylene, alkarylene O, O-alkylene, O-arylene, O-alkarylene S, S-alkylene, S-arylene, S-alkarylene CO, CO-alkylene, CO-arylene, CO-alkarylene NH, NH-alkylene, NH-arylene, NH-alkarylene
x = 0 or 1
Y = X,

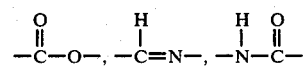

Z = alkylene, alkylene radical with a base of polyesters, polyethers, polyamides, polycarbonates, polyurethanes
R = H, CH$_3$, alkyl, —O—CH$_3$, —O-alkyl, —NO$_2$, —NR'$_2$, —NR'R'', —NHCOR'''

In particular the radical Z, which is preferably of higher molecular weight, serves for elasticizing.

For the component A—low molecular weight epoxy resins containing aromatic groups and having an epoxy equivalent weight under 375—polyepoxides are suitable. As polyepoxides materials which contain two or more epoxide groups in the molecule can be used in the present invention. Preferred are compounds with two epoxy groups in the molecule. The polyepoxies have a relatively low molecular weight of at most 750, preferably 400 to 500. The polyepoxies may be e.g. polyglycidyl ethers of polyphenols, such as bisphenols, advantageously for example bisphenol A. These polyepoxies can be produced by etherification of a polyphenol with an epihalohydrin in the presence of alkali. Examples of suitable phenol compounds are bis(4-hydroxyphenyl)-2,2-propane, 4,4'-dihydroxybenzophenone, bis(4- hydroxyphenyl)-1,1-ethane, bis(4-hydroxyphenyl)-1,1-isobutane and hydantoin epoxies.

Another suitable class of polyepoxies are polyglycidyl ethers of phenolic novolak resins.

Advantageously also polyglycidyl esters of aromatic polycarboxylic acids can be used.

As component B, aliphatic and/or alicyclic polyfunctional alcohols or carboxylic acids having a molecular weight under 350 are employed. Advantageously they have a branched aliphatic chain, in particular with at least one neostructure.

Suitable compounds correspond to the following general formula:

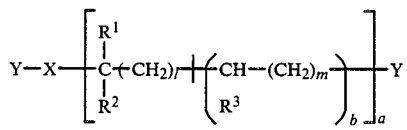

Herein
Y=OH, COOH
X=(CH$_2$)$_n$

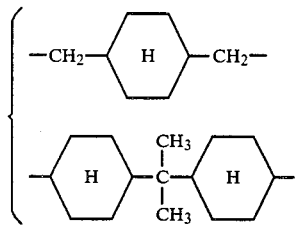

R$^1$, R$^2$, R$^3$=H, alkyl radical with 1 to 5 carbon atoms
a=0; 1
b=0; 1
l=0–10
m, n=1–10

As examples may be named:

Diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, butene-2-diole-1,4, 1,2-pentanediol, 1,5-pentanediol, 3-methyl-1,5-pentanediol, 1,6-hexanediol, 2-ethyl-1,3-hexanediol, 2,5-dimethyl-2,5-hexanediol, 1,3-octanediol, 4,5-nonanediol, 2,10-decanediol, 2-hydroxyethyl-hydroxy-acetate, 2,2-dimethyl-3-hydroxypropyl-2,2-dimethylhydroxypropionate, 2-methyl-2-propyl-3-hydroxypropyl-2-methyl-2-propylhydroxypropionate, 4,4'-methylenebiscyclohexane and 4,4'-isopropylidenebiscyclohexanol.

Some preferred diols are 2,2-dimethyl-1,3-propanediol, 3-methyl-1,5-pentanediol, 2,2-dimethyl-3-hydroxypropyl-2,2-dimethylhydroxypropionate and 4,4'-isopropylidenebiscyclohexanol.

As carboxylic acids for component B a plurality of dicarboxylic acids enter into consideration, as described in DE-OS No. 3,108,073.

What is essential is that the compounds of component B are reacted with component A in such a proportion that the reaction product has the stated content of aromatic groups, calculated as phenylene group, of 10 to 45%.

The epoxy resin is chain-extended with component C. Its percentage of total binder is 5 to 40 percent by weight, referred to the total binder. Polyphenols suitable for component C correspond to the above-explained general formula

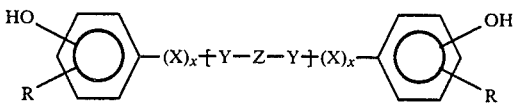

Component C can advantageously be produced for example in the following manner. One mole of a higher-molecular diol, e.g. a polyester diol, polycaprolacton diol, polyether diol, polycarbonate diol or the like, is esterified with two moles of a hydroxyphenyl carboxylic acid or with two moles of a hydroxyphenyl carboxylic acid ester. Suitable hydroxycarboxylic acids are n-hydroxybenzoic acid, n-hydroxyphenyl acetic acid and 3-(4-hydroxyphenyl-) propionic acid or their esters.

If the attaching of the hydroxyphenyl group is carried out by transesterification, also a basic transesterification may be performed, using for this the alkali phenolates of the respective hydroxyphenyl carboxylic acid esters. After the end of the reaction the product must be subjected to an acid process, to obtain the desired polyphenol.

For direct esterification there may be used for example also N-(4-hydroxyphenyl-)glycin. In another variant, any desired acid polyesters may be reacted with n-hydroxyaniline to the desired polyphenols.

In another advantageous realization, polyether diamines or similar polyamines are reacted, for example, with 4-hydroxy-3-methoxybenzaldehyde to the polyphenols.

The amines used as component D for the reaction with the epoxide compound may be primary, secondary or tertiary, secondary amines being especially well suited. Primary and secondary amines can be attached directly to the epoxide ring, tertiary amines only in the form of their ammonium salts or by way of an additional functional group in the molecule. Preferably the amine should be a compound soluble in water. Examples of such amines are mono- and di-alkylamines, such as methylamine, ethylamine, propylamine, butylamine, dimethylamine, diethylamine, dipropylamine, methylbutylamine and the like. Suitable are also alkanolamines as for example, methylethanolamine, diethanolamine and the like. Further, dialkylaminoalkylamines, as for example dimethylaminoethylamine, diethylaminopropylamine and the like, are suitable.

In most cases low-molecular amines are used, but it is possible also to use higher-molecular amines, in particular if it is intended to increase the flexibility of the resin by the incorporation of such amines. Similarly also mixtures of low-molecular and higher-molecular amines can be used to modify the resin properties.

Polyamines with primary and secondary amino groups can be reacted with the epoxide groups in the form of their ketimines. The ketimines are produced from the polyamines in known manner.

The amines may also contain other groups, but these should not disturb the reaction of the amine with the epoxy group and should not lead to jelling of the reaction mixture.

Frequently the reaction of the amine with the epoxy group-containing compound sets in already as these materials are being mixed. But heating to moderately elevated temperatures may possibly be desirable, e.g. to 50° to 150° C., although reactions are possible also at lower and at higher temperatures. To terminate the reaction it is often advantageous to raise the temperature toward the end of the reaction at least slightly for a sufficient time to ensure a complete reaction.

For the reaction with the epoxy-containing compound there should be used at least a quantity of amine such that the resin assumes a cationic nature, i.e. that under the influence of a voltage in the coating bath it migrates to the cathode if it has been solubilized by addition of an acid. Essentially all epoxy groups of the resin can be reacted with an amine. But it is possible also to leave excess epoxy groups in the resin; upon contact with water they will hydrolyze, forming hydroxyl groups.

Another possibility to achieve the required dispersibility in water is to use as component D Mannich bases, i.e. reaction products of suitable phenols, carrying groups suitable for reaction with an epoxide ring, with formaldehyde and a secondary amine. This, at the same time, makes the binder spontaneously cross-linkable.

Further, the amines can be added to the epoxy resins by way of Tscherniac-Einhorn-Michael adducts. These adducts are produced by the following synthesis. First, phenols are reacted with methylol(meth)acrylamide to the Tscherniac-Einhorn intermediate product, whereupon the double bonds are covered with amines. The end products can be reacted with the epoxide groups of the binder by way of the phenol group.

Instread of said amines, or together with them, also the salt of an amine can be used. As amine salt the salt of a tertiary amine can be used. Acids usable in the invention which are suitable for neutralizing the amines include boric acid or other acids with a greater dissociation constant than boric acid, preferably organic acids with a dissociation constant greater than for instance $1 \times 10^{-5}$. The preferred acid is acetic acid. Examples of other acids are formic acid, lactic acid, propionic acid, butyric acid, hydrochloric acid, phosphoric acid, and carbonic acid.

The amine component of the amine-acid salt is an amine which may be unsubstituted or substituted as in the case of hydroxylamine, but these substituents should not disturb the reaction of the amine-acid salt with the polyepoxy and should not jell the reaction mixture. Preferred amines are tertiary amines, such as dimethylethanolamine, triethylamine, trimethylamine, triisopropylamine and the like. Examples of other suitable amines are given in U.S. Pat. No. 3,839,252, column 5, line 3, to column 7, line 42.

The amine-acid salt mixture is obtained in known manner by reaction of the amine with the acid. Also amine-acid mixtures may be used, although as a rule they react, forming the acid salt.

The reaction temperature for the reaction of the amine-acid salts with the poly-epoxies can be varied between the lowest temperature at which the reaction proceeds at an appreciable rate, e.g. room temperature or, as a rule, somewhat higher than room temperature, to a maximum temperature between about 10° and 100° C. A solvent is not necessary for the reaction, although frequently it is added in order to be able to control the reaction better. As solvents, aromatic hydrocarbons or monoalkyl ethers of ethylene glycol enter into consideration.

The specific starting materials, quantities and reaction conditions are chosen in accordance with well-known experience in such a way that jelling of the product during the reaction is avoided. Thus, for example, overly aggressive reaction conditions are not applied. Similarly, starting materials with reactive substituents able to react with the epoxy compounds are not used, as they might have an adverse effect on the reaction.

In order to obtain highly stable coatings with the binder according to the invention, it is advantageous to add to the electro-dip paint a crosslinking agent which at elevated temperatures causes the cross-linking of the binder, or to modify the binder so that it contains reactive groups which at elevated temperatures cause spontaneous cross-linkage. A spontaneously crosslinking system can advantageously be obtained in that the binder (is reacted) with a partially blocked polyisocyanate which on the average possesses one free isocyanate group per molecule and whose blocked isocyanate groups are stable at room temperature and are unblocked at elevated temperatures and react with the hydroxyl groups formed by the opening of the epoxide rings with urethane formation. The binder may be spontaneously cross-linkable by the use of the previously described bases as component D.

Frequently employed methods for the cross-linking of binders are published e.g. in the following disclosures: DE-OS No. 2,057,799, European patent application Nos. 12,463 and 4090, and DE-OS No. 2,752,256.

If crosslinking agents are used, they represent as a rule about 5 to about 60 percent by weight of the binder. Preferred are about 20 to 40 percent by weight of the binder.

Examples of suitable aminoplast crosslinking agents are the hexamethyl ether of hexamethylol melamine, the triethylmethyl ether of hexamethylol melamine, the hexabutyl ether of hexamethylol melamine and the hexamethyl ether of hexamethylol melamine and polymeric butylated melamine formaldehyde resins.

Urea-aldehyde crosslinking agents can be produced in known manner by reacting urea and an aldehyde to the resol stage and alkylizing the reaction product with an alcohol under acid conditions, an alkylated urea-aldehyde resin being obtained. An example of a suitable crosslinking agent with a base of an urea-aldehyde resin is a butylated urea-formaldehyde resin.

As crosslinking agents, also blocked polyisocynates can be employed. For the invention any desired polyisocyanates may be used wherein the isocyanate groups have been reacted with a compound so that the formed blocked polyisocyanate is stable to hydroxyl groups at room temperature, but reacts at elevated temperatures, as a rule in the range from about 90° to about 300° C. For the production of the blocked polyisocyanates any desired organic polyisocyanates suitable for crosslinking may be used.

The organic polyisocyanates entering into consideration as crosslinking agents in the invention may also be prepolymers, derived, for example, from a polyol, including a polyether polyol or a polyester polyol.

For the blocking of the polyisocyanates, any desired suitable aliphatic, cycloaliphatic or aromatic alkyl monoalcohols may be used. Other suitable blocking agents are hydroxylamines or secondary amines.

The blocked polyisocyanates are produced by reacting a sufficient quantity of the blocking agent with the organic polyisocyanate, so that there are no longer any free isocyanate groups. The reaction between the organic polyisocyanate and the blocking agent is exothermic. For this reason the polyisocyanate and the blocking agent are mixed preferably at a temperature not higher than 80° C., in particular lower than 50° C., to counteract the exothermic effect.

The invention relates also to a method for the production of a binder for cationic electro-dip paints by reaction of
(A) low molecular weight epoxy resins, containing aromatic groups and having an epoxy equivalent weight under 375, with
(B) aliphatic and/or alicyclic poly-functional alcohols or carboxylic acids having a mean molecular weight under 350 in such a way that the reaction products contain a proportion of aromatic groups, calculated as phenylene group, of 10 to 45 percent by weight, and further modification of the resulting intermediate product with
(C) a compound with at least two hydroxyl groups and a molecular weight over 350 with addition to the epoxide groups and further reaction of the reaction product of (A), (B) and (C) with
(D) primary and/or secondary amines or ammonium salts to achieve the required dispersibility in water,
characterized in that as component (C) 5 to 40 percent by weight, referred to the sum of the components (A), (B), (C) and (D), of an elasticized polyphenol are employed which corresponds to the above-explained general formula

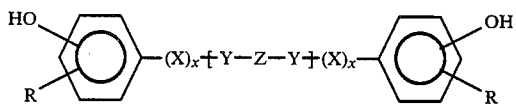

The process is carried out as follows: The component A and the component B are mixed and completely reacted, optionally with the addition of catalysts, e.g. tertiary amines, at temperatures between 100° and 140° C., preferably 115° to 135° C. The reaction can be checked by means of the epoxy equivalent weight. This reaction product of the components A and B can, if desired, be further modified with the component C at temperatures between 100° and 140° C. This reaction, too, can be checked by means of the epoxide equivalent weight. The reaction product thus obtained still contains free epoxy groups.

For this reaction step the same catalysts can be used as for the reaction of the components A and B. The reaction product thus obtained is reacted with the component D at temperatures between 90° and 140° C., so that a binder is formed which contains basic amino groups. By addition of acids the basic reaction product can be protonized wholly or partially and subsequently dispersed in water. The cross-linking agent can be added to the binder before the dispersion in water or, depending on the reactivity, be introduced during the production of the binder. In the case of partially blocked polyisocyanates, they are reacted with the binder at temperatures between 80° and 150° C., preferably at temperatures between 100° and 130° C. The resulting binders constitute stable dispersions easy to handle. If desired, it may be appropriate also to dissolve the binders in suitable organic solvents before the dispersion is prepared. Suitable solvents are e.g. glycol ether, ethyl glycol, butyl glycol, ketones, such as ethyl diethyl ketone, methylethyl ketone, methylisobutyl ketone and others.

The invention further relates to the use of the binders for electro-immersion baths.

To make the synthetic resin sufficiently cationic for electro-deposition, the neutralizable nitrogen is generally maintained between 0.3 and 3 mulli-equivalents per gram of the total resin solids.

Aqueous dispersions of the resin products of the invention are very suitable as coating compositions, in particular for the production of coatings by electrodeposition. Alternatively the coating compositions can be applied on the substrates by conventional methods. For the dispersion in water the resinous products are neutralized, to form cationic groups, e.g. salts of tertiary amines and, in the case of hydrolyzed ketimine-containing resins, salts of primary amines.

The neutralization of the products is obtained by reaction of a part or of all amino groups by a water-soluble acid, e.g. formic acid, acetic acid or phosphoric acid. The degree of neutralization depends on the particular resin, and in general it is sufficient to add only enough acid for the resin to be dispersible in water.

The concentration of the resinous products in the aqueous medium depends on the process parameters to be used and, as a rule, is not critical. Normally water constitutes the bulk of the aqueous dispersion. The aqueous dispersion may contain e.g. about 5 to about 50 wt.% resin solids.

The electro-immersion baths may contain the usual pigments. Often a dispersing agent or a surface-active agent is added to the pigments. The pigment and the optionally used surface-active agent are milled in a portion of the binder jointly or alone, to produce a paste, which is blended with the rest of the binder to produce the coating composition.

In some cases it is advantageous to add a non-ionic modification agent or solvent to the electro-immersion bath, in order to improve the dispersibility, the viscosity and/or the film quality. Examples of such materials are aliphatic, naphthenic and aromatic hydrocarbons or mixtures thereof; mono- and di-alkyl ethers of glycols, Siberian fir needle oil and other solvents compatible with the resin system.

Other additives, such as antioxidants, may be added to the electro-immersion bath as well. Examples are ortho-amylphenol or cresol. The addition of such antioxidants is especially desirable if the precipitation baths are exposed to atmospheric oxygen at elevated temperatures with agitation for prolonged periods of time.

Other additions which the bath may optionally contain are wetting agents, such as petroleum sulfonates, sulfatized fatty amines or their amides, alkylphenoxypolyethylene alkanols or phosphate esters, including those of ethoxylated alkylphenol phosphates. Other groups of possible additions are anti-foamants and suspension agents. For the formulation of the precipitation bath normal tap water may be used. But as such water contains a relatively high proportion of salts, undesired changes may thereby be caused in the electrodeposition. For this reason, deionized water is generally preferred.

The following list of possible additions is not complete, as any desired other additions which do not interfere with the electrodeposition can be used.

The invention further relates to a process for the electrophoretic coating of an electrically conductive substrate connected as cathode, from an aqueous bath with a base of cationic binders at least partially neutralized with acids, the binders having been obtained by reaction of (A) low-molecular epoxy resins containing aromatic groups and having an epoxide equivalent weight under 375 with (B) aliphatic and/or alicyclic poly-functional alcohols or carboxylic acids having a mean molecular weight under 350 in such a way that the reaction products contain a proportion of aromatic groups, calculated as phenylene group, of 10 to 45 percent by weight, and further modification of the resulting intermediate product with (C) a compound with at least two hydroxyl groups and a molecular weight over 350 with addition to the epoxide groups and further reaction of the reaction product of (A), (B) and (C) with A (D) primary and/or secondary amines or ammonium salts to achieve the required dispersibility in water, the binders having been made spontaneously crosslinkable by reaction or the bath containing an additional crosslinking agent, characterized in that for the production of the binders as component (C) 5 to 40 percent by weight, referred to the sum of the components (A), (B), (C) and (D), of elasticized polyphenol are employed which corresponds to the above explained general formula

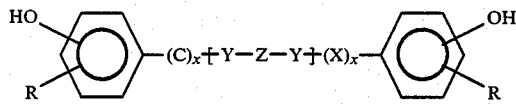

Any desired electrically conductive substrate may serve as substrate in the electrodeposition. Normally these are metal substrates, as for instance iron, steel, copper, zinc, brass, tin, nickel, chromium and aluminum, as well as other metals, pretreated metals, phosphatized or chromated metals. Also impregnated paper and other conductive substrates can be used.

For the cationic deposition the objects to be coated are immersed in an aqueous dispersion of the solubilized, film-forming cationic binder. An electric voltage is applied between the object to be coated, which serves as cathode, and an anode, and the cationic binder is deposited on the cathode by the electric current. Then the object is removed from the bath and, as a rule, rinsed. Then the coating is hardened in the usual manner by heating.

The invention will be explained more specifically in the following examples. All data on parts and percentages are given by weight, unless otherwise expressly noted.

PREPARATION OF A CROSSLINKING AGENT I

A reactor, equipped with a heating device, a cooler, an agitator, a thermometer, an outlet line leading to a washing device, and a system for introducing nitrogen, is charged with 12,280 parts toluylene diisocyanate (mixture of about 80% 2,4-toluylene diisocyanate and about 20% 2,6-toluylene diisocyanate). Nitrogen is introduced and the cooler is turned on. In the course of 5 hours 5550.5 parts 2-ethylhexanol are added gradually, the temperature, rising gradually to 50° C. While the temperature of 50° C. is maintained, an additional 3649.5 parts 2-ethylhexanol are added in the course of 4 hours. The reaction mixture is maintained for 75 minutes at 50° C., then the cooler is turned off and 3.6 parts dibutyl tin dilaurate are added. The heating device is connected and the reaction mixture is heated to 65° C. in the course of 45 minutes. In the course of two hours and 50 minutes 3184 parts 1,1,1-trimethylol propane are added, the temperature rising from 65° to 120° C. The reaction mixture is maintained at this temperature for 90 minutes, then 10,560 parts 2-ethoxyethanol are added. The resulting product is a solution of a polyurethane crosslinking agent.

PREPARATION OF A CROSSLINKING AGENT II 2340 g glycidyl ester of 2-methyl-2-ethyl heptanic acid are heated with 2073 g trimellitic acid anhydride to 130° C. in a reaction vessel. At that point the highly exothermic reaction starts up. By external cooling the reaction is maintained at 150° C. until an acid number of 183 is reached. Then the temperature is reduced to 90° C. and 1450 g MIBK* are added. Therefore 835 g propylene oxide are slowly added in drops. At acid number 2 the reaction is stopped. The solid content of the resin solution is adjusted with additional MIBK* to 70%.
*MIBK=methyl isobutyl ketone

PREPARATION OF AN ELASTICIZED POLYPHENOL I

In a suitable reaction vessel with shield gas introduction, 500 g of a polycaprolacton diol (OH number 210.9) and 286 g p-hydroxybenzoic acid methyl ester are charged. The mixture is heated to 140° C. and homogenized. Then 3.9 g tin octate are added, heating to 180° C. At this point the methanolysis begins. After completed splitting off, agitation is continued for another hour at 180° C., whereupon the product is cooled.

PREPARATION OF AN ELASTICIZED POLYPHENOL II

The procedure is as in the preparation of the polyphenol I, but using 695 g of a polytetrahydrofurane diol instead of the polycaprolacton diol (OH number 152).

PREPARATION OF AN ELASTICIZED POLYPHENOL III

In a suitable reactor 550 g adipic acid, 262 g neopentyl glycol, 49 g xylene and 0.8 g dibutyl tin oxide are charged and heated. At 132° C. the splitting off of water begins. The temperature is slowly raised to 186° C. and maintained until the corresponding quantity of water is eliminated (90 g). This is followed by cooling to 100° C. and addition of 274 g p-aminophenol. Then the temperature is increased again. At 162° C. water again splits off. The temperature is slowly raised to 185° C. and maintained constant until 45 g water have split off. Thereafter the xylene is distilled. To introduce the elasticized binder into the resins, the polyphenol is preheated to 100° C.

PREPARATION OF A BINDER I

In a suitable 5-liter reactor 1041 g of a commercial epoxy resin with a base of bisphenol A (epoxide equivalent weight 188), 41 g xylene and 144 g neopentyl glycol are charged and heated to 125° C. Then 4.7 ml dimethylbenzylamine are added, heating to 130° C. As soon as the epoxy equivalent weight of 417 is reached, 358 g of the elasticized polyphenol I, 19 g xylene and 1.8 ml dimethylbenzylamine are added, heating to 160° C. As soon as an epoxy equivalent weight of 1233 is reached, 1202 g of the crosslinking agent I, 113 g of a ketimine and 82 g methylethanolamine are added and the reaction is continued for 1 hour at 115° C. Then 38 g propylene glycol monomethyl ether are added, mixing under for 15 minutes. Meanwhile one prepares a dispersion bath from 1927 g deionized water, 31.9 g glacial acetic acid, 11.5 g butyl glycol and 11.5 g of a commercial antifoam. In it 2500 g of the above described binder are dispersed. After one hour, 1187 g deionized water are added, mixing under for 30 minutes.

| Solids | 38.2% |
|---|---|
| pH value | 7.2 |
| MEQ acid | 0.2880 |
| MEQ base | 0.6243 |

PREPARATION OF A BINDER II

The procedure as for binder I is followed, but using the elasticized polyphenol II and crosslinking agent II.

| Epoxy resin (EEW 188) | 917 parts |
|---|---|
| Xylene | 36 parts |
| Neopentyl glycol | 127 parts |
| Dimethylbenzylamine | 3.6 parts |
| Polyphenol II | 547 parts |
| Dimethylbenzylamine | 2.8 parts |
| Crosslinking agent II | 1202 parts |
| Ketimine | 100 parts |
| Methylethanolamine | 72 parts |
| Propylene glycol monophenyl ether | 127 parts |
| Ethyl glycol | 38 parts |
| Resin solution | 2500 parts |
| Deionized water | 1855 parts |
| Glacial acetic acid | 27 parts |
| Antifoam | 10 parts |
| Butyl glycol | 10 parts |
| Deionized water | 1164 parts |

The dispersion is thereafter heated to 60° C. under vacuum. Thereby 310 ml organic phase are drawn off. After cooling, the dispersion is filtered. It has the following characteristic values.

Characteristic data of the dispersion:

| Solids (30 min., 150° C.) | 37.2% |
|---|---|
| pH value | 6.8 |
| MEQ acid | 0.3142 |
| MEQ base | 0.5918 |

PREPARATION OF A BINDER III

The procedure as for binder I is followed, but using the elasticized polyphenol II.

| Epoxy resin (EEW 188) | 966 parts |
|---|---|
| Xylene | 38 parts |
| Neopentyl glycol | 133 parts |
| Dimethylbenzylamine | 3.8 parts |
| Polyphenol II | 480 parts |
| Dimethylbenzylamine | 3 parts |
| Crosslinking agent I | 1201 parts |
| Ketimine | 105 parts |
| Methylethanolamine | 75 parts |
| Propylene glycol monophenyl ether | 127 parts |
| Ethyl glycol | 38 parts |
| Resin solution | 2500 parts |
| Deionized water | 1855 parts |
| Glacial acetic acid | 29 parts |
| Antifoam | 10 parts |
| Butyl glycol | 10 parts |
| Deionized water | 1165 parts |

Characteristic data of dispersion III

| Solids (30 min., 150° C.) | 35.1% |
|---|---|
| pH value | 7.3 |
| MEQ acid | 0.3098 |
| MEQ base | 0.6301 |

PREPARATION OF A GRAY PIGMENT PASTE

To 953 parts of a bisphenol A-based commercial epoxy resin having an epoxide equivalent weight of 8% add 800 parts butyl glycol. Heat the mixture to 80° C. Then introduce into the resin solution 221 parts of a reaction product of 101 parts diethanolamine and 120 parts 80% aqueous lactic acid. The reaction is carried out at 80° C. until the acid number had dropped below 1.

To 1800 parts of this product add 2447 parts deionized water and mix with 2460 parts $TiO_2$, 590 parts of an aluminum silicate-based extender, 135 parts lead silicate and 37 parts carbon black. In a grinding unit comminute this mixture to a Hegman fineness of 5 to 7. Then add 1255 parts deionized water to obtain the desired consistency of the paste. This gray paste is very stable in storage.

PREPARATION OF THE ELECTRO-IMMERSION BATHS AND SEPARATION OF LACQUER FILMS

Portions of 2000 parts by weight of the above described binder dispersions are mixed with 775 parts by weight of the gray pigment paste. With deionized water the non-volatile matter of the bath is adjusted to 20% (150° C., 30 min.). The bath is then aged for 3 days while being agitated. The deposition of the lacquer films takes place in 2 minutes on zinc phosphated sheetmetal. The bath temperature is 27° C. The deposited films are baked for 20 minutes at 180° C.

| | Dispersion I | Dispersion II | Dispersion III |
|---|---|---|---|
| Deposition voltage (V) | 290 | 310 | 310 |
| Film thickness μm | 32 | 37 | 35 |
| Grid section* | 0 | 0 | 0 |
| Adhesion | good | very good | very good |
| Flow* | 1.5 | 1.0 | 1.0 |
| Erichsen cupping index (mm) | 9.8 mm | 8.3 mm | 9.4 mm |
| Cross-linkage** | o.k. | o.k. | o.k. |

*0 best value, 5 worst value
**20 double strokes MIBK

We claim:

1. A water-dispersible binder for cationic electro-dip paints, obtained by reaction of
   (A) a low molecular weight epoxy resin, containing aromatic groups and having an epoxy equivalent weight under 375, with
   (B) an aliphatic and/or alicyclic poly-functional alcohol and/or a carboxylic acid having a mean molecular weight under 350 to an epoxy group-containing intermediate product which contains a proportion of aromatic groups, calculated as phenylene group, of 10 to 45 percent by weight, and further modification of the resulting intermediate product with (C) a compound having a molecular weight over 350 and being of the formula

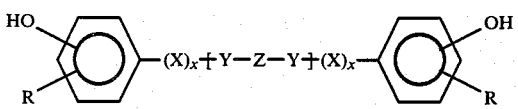

wherein
X is alkylene, arylene, alkarylene, O, O-alkylene, O-arylene, O-alkarylene, S, S-alkylene, S-arylene, S-alkarylene, —CO, CO-alkylene, CO-arylene, CO-alkarylene, —SO$_2$—, SO$_2$-alkylene, SO$_2$-arylene or SO$_2$-alkarylene;
x is 0 or 1;
Y is X,

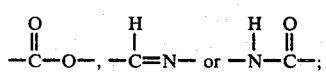

Z is alkylene, polyester, polyether, polycarbonate or polyurethane;
R is H, CH$_3$, alkyl, —OH—CH$_3$, —O-alkyl, —NO$_2$, —NR'R'' or —NHCOR''';
provided that
when X is O, NH or S, Y is other than O, O-alkylene, O-arylene, O-alkarylene, S, S-alkylene, S-arylene, S-alkarylene, —NHCO—, NH-alkylene, NH-arylene or NH-alkarylene;
when X is CO or SO$_2$, Y is other than CO, CO-alkylene, CO-arylene, CO-alkarylene, SO$_2$, SO$_2$-alkylene, SO$_2$-arylene, SO$_2$-alkarylene or CO$_2$—; to provide a second intermediate product and further reaction of the second intermediate product with (D) a primary and/or secondary amine or ammonium salt to achieve the required dispersibility in water.

2. A binder according to claim 1 wherein component A is an epoxy resin with a base of bisphenol A.

3. A binder according to claim 1, wherein component A is a polyglycidyl ester.

4. A binder according to claim 2 or 3, wherein component B is a diol or a dicarboxylic acid with a branched aliphatic chain.

5. A binder according to claim 2 or 3 wherein component B is a diol or a dicarboxylic acid with at least one neostructure.

6. A binder according to claim 1, 2 or 3 wherein the molecular weight of component C is 530 to 3000.

7. A binder according to claim 1, 2 or 3 wherein the proportion of component C is 5 to 40 percent by weight, referred to the total amount of binder.

8. A binder according to claim 1, 2 or 3 which has been further reacted with a partially blocked polyisocyanate which on the average possesses one free isocyanate group per molecule and whose blocked isocyanate groups are stable at room temperature.

9. A method for the production of a binder for cationic electro-dip paints with a base of a reaction product of a modified epoxy resin and a primary, secondary and/or tertiary amine as well as an ammonium salt or sulfide/acid or phosphine/acid mixture which contains a crosslinking agent, a pigment, and a leveling agent comprising:

(A) reacting a low molecular weight epoxy resin containing aromatic groups and having an epoxide equivalent weight epoxy resin containing armomatic groups and having an epoxide equivalent weight under 375 with (B) an aliphatic and/or alicyclic poly-functional alcohol or carboxylic acid having a molecular weight under 350 to cause addition to the epoxide groups and to produce an intermediate product containing epoxide groups, the relative ratios of (A) and (B) being calculated so that the intermediate product contains a proportion of aromatic groups, calculated as phenylene group, of 10 to 45%; and further reacting the intermediate product with (C) an elasticized polyphenol having a molecular weight over 350 and being of the formula

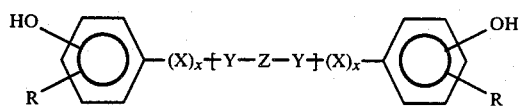

wherein
X is alkylene, arylene, alkarylene, O, O-alkylene, O-arylene, O-alkarylene, S, S-alkylene, S-arylene, S-alkarylene, —CO—, CO-alkylene, CO-arylene, CO-alkarylene, —SO$_2$—, SO$_2$-alkylene, SO$_2$-arylene, SO$_2$-alkarylene, NH, NH-alkylene, NH-arylene, NH-alkarylene;
x is 0 or 1;
Y is X,

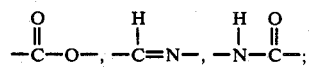

Z is alkylene, polyester, polyether, polyamide, polycarbonate, polyurethane;
R is H, CH$_3$, alkyl-, —O—CH$_3$, —O-alkyl, —NO$_2$, —NR'$_2$, —NR'R'', —NHCOR'''.
provided that
when X is O or S, Y is other than O, O-alkylene, O-arylene, O-alkarylene, S, S-alkylene, S-arylene, S-alkarylene, —NHCO—, NH-alkylene, NH-arylene or NH-alkarylene;
when X is CO or SO$_2$, Y is other than CO, CO-alkylene, CO-arylene, CO-alkarylene, SO$_2$, SO$_2$-alkylene, SO$_2$-arylene, SO$_2$-alkarylene or —CO$_2$—; to produce a second intermediate product; and, to obtain the required dispersibility in water, reacting the second intermediate product with (D) a primary and/or secondary amine and/or the salt thereof.

10. A method according to claim 9 wherein component A is an epoxy resin with a base of bisphenol A.

11. A method according to claim 9 wherein a polyglycidyl ester is used as the epoxy resin.

12. A method according to claim 9, 10 or 11, wherein as component B, a diol or a dicarboxylic acid with a branched aliphatic chain is used.

13. A method according to claim 9, 10 or 11 wherein as component B, a diol or a dicarboxylic acid with at least one neostructure is used.

14. A method according to claim 9, 10 or 11 wherein the molecular weight of component C is 530 to 3000.

15. A method according to claim 9, 10 or 11 wherein the proportion of component C is 5–40 wt. %, referred to the total binder.

16. A method according to claim 9, 10 or 11 wherein the binder is reacted with a partially blocked polyisocyanate which on the average possesses one free isocyanate group per molecule and whose blocked isocyanate groups are stable at room temperature.

17. A method for the electrophoretic coating of an electrically conductive substrate, connected as cathode, from an aqueous bath with a base of a cationic binder at least partially neutralized with acid the binder having been made spontaneously cross-linkable by reaction, or the bath containing an additional crosslinking agent, the binder is a reaction product of
   (A) a low molecular weight epoxy resin containing aromatic groups and having an epoxide equivalent weight under 375.
   (B) an aliphatic and/or alicyclic poly-functional alcohol and/or carboxylic acid having a molecular weight under 350;
   (C) an elasticized polyphenol having a molecular weight over 350; and
   (D) a primary and/or secondary amine and/or an ammonium salt the reaction product of A and B having a content of aromatic groups, calculated as phenylene group, of 10–45%;
the polyphenol having the formula

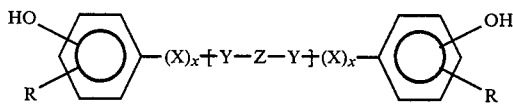

wherein
X is alkylene, arylene, alkarylene, O, O-alkylene, O-arylene, O-alkarylene, S, S-alkylene, S-arylene, S-alkarylene, —CO—, CO-alkylene, CO-arylene, CO-alkarylene, —SO$_2$—, SO$_2$-alkylene, SO$_2$-arylene, SO$_2$-alkarylene, NH, NH-alkylene, NH-arylene, NH-alkarylene;
X is 0 or 1;
Y is X,

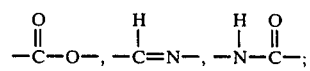

Z is alkylene, polyester, polyether, polyamide, polycarbonate, polyurethane;
R is H, CH$_3$, alkyl, —O—CH$_3$, —O-alkyl, NO$_2$, —NR'$_2$, —NR'R", —NHCOR'";
provided that
when X is O or S, Y is other than O, O-alkylene, O-arylene, O-alkarylene, S, S-alkylene, S-arylene, S-alkarylene, —NHCO—, NH-alkylene, NH-arylene or NH-alkarylene
when X is CO or SO$_2$, Y is other than CO, CO-alkylene, CO-arylene, CO-alkarylene, SO$_2$, SO$_2$-alkylene, SO$_2$-arylene, SO$_2$-alkarylene, or —CO$_2$—.

18. A method according to claim 17 wherein component A is a epoxy resin with a base of bisphenol A.

19. A method according to claim 17 wherein component A is a polyglycidyl ester.

20. A method according to claim 17, 18 or 19 wherein the component B is a diol or a dicarboxylic acid with a branched aliphatic chain.

21. A method according to claim 17, 18 or 19 wherein the component B is a diol or a dicarboxylic acid with at least one neostructure.

22. A method according to claim 17, 18 or 19 wherein the molecular weight of component C is 530 to 3000.

23. A method according to claim 17, 18 or 19 wherein the proportion of component C is 5 to 40 wt.%, referred to the total amount of binder.

* * * * *